United States Patent
Song et al.

(10) Patent No.: US 10,253,992 B2
(45) Date of Patent: Apr. 9, 2019

(54) MULTI-SPLIT AIR-CONDITIONER AND OUTDOOR UNIT SYSTEM THEREOF

(71) Applicants: GD MIDEA HEATING & VENTILATING EQUIPMENT CO., LTD., Foshan (CN); MIDEA GROUP CO., LTD., Foshan (CN)

(72) Inventors: Rui Song, Foshan (CN); Hehui Zhang, Foshan (CN); Bin Luo, Foshan (CN)

(73) Assignees: GD MIDEA HEATING & VENTILATING EQUIPMENT CO., LTD., Foshan (CN); MIDEA GROUP CO., LTD., Fosham (CN)

( * ) Notice: Subject to any disclaimer, the term of this patent is extended or adjusted under 35 U.S.C. 154(b) by 12 days.

(21) Appl. No.: 15/510,399

(22) PCT Filed: May 29, 2015

(86) PCT No.: PCT/CN2015/080348
§ 371 (c)(1),
(2) Date: Mar. 10, 2017

(87) PCT Pub. No.: WO2016/062091
PCT Pub. Date: Apr. 28, 2016

(65) Prior Publication Data
US 2017/0284684 A1 Oct. 5, 2017

(30) Foreign Application Priority Data
Oct. 21, 2014 (CN) .......................... 2014 1 0562591

(51) Int. Cl.
F24F 1/06 (2011.01)
F25B 41/04 (2006.01)
(Continued)

(52) U.S. Cl.
CPC ................. *F24F 1/06* (2013.01); *F24F 3/065* (2013.01); *F25B 41/04* (2013.01); *F25B 41/046* (2013.01);
(Continued)

(58) Field of Classification Search
CPC . F24F 1/06; F24F 3/065; F25B 41/046; F25B 2313/02741; F25B 2313/02742;
(Continued)

(56) References Cited

U.S. PATENT DOCUMENTS 5,634,352 A * 6/1997 Nagai ................... F16K 11/065
62/278
6,735,973 B2 5/2004 Lee
(Continued)

FOREIGN PATENT DOCUMENTS

| CN | 1469084 A | 1/2004 |
| CN | 1483971 A | 3/2004 |

(Continued)

OTHER PUBLICATIONS

PCT/CN2015/080348 English Translation of the International Search Report & Written Opinion dated Sep. 2, 2015, 13 pages.
(Continued)

*Primary Examiner* — Emmanuel Duke
(74) *Attorney, Agent, or Firm* — Lathrop Gage LLP (57) ABSTRACT

A multi-split air-conditioner and an outdoor unit system thereof are provided. The outdoor unit system includes: a compressor (1) having a gas outlet (a) and a gas inlet (b); an outdoor heat exchanger (2) having an inlet (c) and an outlet (d); a switching assembly (3) having first to sixth ports, wherein the first port (e) is connected with the gas outlet (a) of the compressor (1), the second port (f) is connected with the gas inlet (b) of the compressor (1), the third port (g) is connected with the inlet (c) of the outdoor heat exchanger
(Continued)

(2), the fourth port (h) is connected with the outlet (d) of the outdoor heat exchanger (2), the fifth port (i) is connected with an inlet pipe (4) and the sixth port (j) is connected with an outlet pipe (5).

18 Claims, 7 Drawing Sheets

(51) Int. Cl.
    *F24F 3/06*     (2006.01)
    *F16K 11/00*     (2006.01)

(52) U.S. Cl.
    CPC ....... *F16K 11/00* (2013.01); *F25B 2313/0276* (2013.01); *F25B 2313/02741* (2013.01); *F25B 2313/02742* (2013.01)

(58) Field of Classification Search
    CPC ........ F25B 41/04; F25B 13/00; F25B 49/022; F16K 11/00; Y02B 30/72
    See application file for complete search history.

(56) References Cited

U.S. PATENT DOCUMENTS

| | | | |
|---|---|---|---|
| 6,883,345 B2 | 4/2005 | Lee | |
| 2003/0230105 A1* | 12/2003 | Lee | F25B 13/00 62/324.6 |
| 2003/0230107 A1* | 12/2003 | Lee | F25B 13/00 62/324.6 |
| 2010/0319376 A1* | 12/2010 | Kawano | F25B 13/00 62/238.6 |
| 2013/0145786 A1* | 6/2013 | Tamaki | F25B 13/00 62/161 |
| 2013/0180274 A1* | 7/2013 | Tamaki | F25B 13/00 62/115 |
| 2014/0311172 A1* | 10/2014 | Iwasaki | F24F 1/06 62/151 |

FOREIGN PATENT DOCUMENTS

| | | |
|---|---|---|
| CN | 102384538 A | 3/2012 |
| CN | 202581678 U | 12/2012 |
| CN | 104390283 A | 3/2015 |
| EP | 0685693 A2 | 12/1995 |
| EP | 0714004 A2 | 5/1996 |
| EP | 1371911 A1 | 12/2003 |
| EP | 1371921 A1 | 12/2003 |
| EP | 1978315 A2 | 10/2008 |
| JP | 01292249 A * | 11/1989 |
| JP | H074779 A | 1/1995 |
| JP | 08170864 A * | 7/1996 |
| JP | H08170865 A | 7/1996 |
| JP | 2008286452 A | 11/2008 |

OTHER PUBLICATIONS

Abstract of Korean Patent Publication No. KR100791930B1 published Jan. 4, 2008, corresponds to EP application Publication No. EP1978315, 1 page.

Chinese patent application 201410562591.1, First Office Action with brief English Translation, dated Mar. 14, 2016, 7 pages.

European Patent Application No. 15852295.3 extended Search and Opinion dated Mar. 1, 2018, 8 pages.

* cited by examiner

MULTI-SPLIT AIR-CONDITIONER AND OUTDOOR UNIT SYSTEM THEREOF

CROSS REFERENCE TO RELATED APPLICATION

This U.S. application is a U.S. National Phase application of the International Patent Application No. PCT/CN2015/080348, filed May 29, 2015, which claims the benefit of prior Chinese Application No. 201410562591.1 filed on Oct. 21, 2014. The entire contents of the before-mentioned patent applications are incorporated by reference as part of the disclosure of this U.S. application.

FIELD

Embodiments of the present invention generally relate to a refrigeration field, and more particularly, to a multi-split air-conditioner and an outdoor unit system thereof.

BACKGROUND

In order not to change a gas outlet and a gas inlet of a system in refrigerating and heating processes for a two-pipe multi-split air-conditioner in the related art, inlet and outlet pipes of a compressor are connected to ends of a four-way valve, and more valves are required to perform a two-pipe function, and thus the multi-split system may have a complex internal structure and many blind pipes appears in a flow passage of the system in the refrigerating or heating process.

SUMMARY

Embodiments of the present invention seek to solve at least one of the problems existing in the related art to at least some extent.

Accordingly, embodiments of the present invention provide an outdoor unit system of a multi-split air-conditioner, which reduces a complexity thereof significantly and has a simple structure.

Embodiments of the present invention further provide a multi-split air-conditioner having the above outdoor unit system.

The outdoor unit system according to embodiments of the present invention includes: a compressor having a gas outlet and a gas inlet; an outdoor heat exchanger having an inlet and an outlet; a switching assembly having first to sixth ports, wherein the first port is connected with the gas outlet of the compressor, the second port is connected with the gas inlet of the compressor, the third port is connected with the inlet of the outdoor heat exchanger, the fourth port is connected with the outlet of the outdoor heat exchanger, the fifth port is connected with an inlet pipe and the sixth port is connected with an outlet pipe.

With the outdoor unit system according to embodiments of the present invention, without changing refrigerant flow directions in inlet and outlet pipes, the outdoor heat exchanger can be switched to connect with the gas outlet or gas inlet of the compressor in the refrigerating or heating process, and the refrigerant flow direction in the inlet of the outdoor heat exchanger is not changed either, and thus the complexity of the outdoor unit system is significantly reduced and the outdoor unit system has a simple structure.

In some embodiments, the switching assembly includes a first four-way valve and a second four-way valve, the first four-way valve has first to fourth valve ports, the second four-way valve has fifth to eighth valve ports, the fourth valve port is connected with the eighth valve port, the first valve port is configured as the first port, the second valve port is configured as the third port, the third valve port is configured as the fifth port, the fifth valve port is configured as the sixth port, the sixth valve port is configured as the fourth port and the seventh valve port is configured as the second port.

In some embodiments, the switching assembly includes a first four-way valve and a second four-way valve, the first four-way valve has first to fourth valve ports, the second four-way valve has fifth to eighth valve ports, the fourth valve port is connected with the eighth valve port, the first valve port is configured as the fourth port, the second valve port is configured as the second port, the third valve port is configured as the fifth port, the fifth valve port is configured as the sixth port, the sixth valve port is configured as the first port and the seventh valve port is configured as the third port.

In some embodiments, the switching assembly includes a first four-way valve and a second four-way valve, the first four-way valve has first to fourth valve ports, the second four-way valve has fifth to eighth valve ports, the fourth valve port is connected with the eighth valve port, the first valve port is configured as the first port, the second valve port is configured as the sixth port, the third valve port is configured as the fourth port, the fifth valve port is configured as the third port, the sixth valve port is configured as the fifth port and the seventh valve port is configured as the second port.

In some embodiments, the first four-way valve and the second four-way valve share a switching assembly capillary which is communicated with the gas outlet of the compressor.

In some embodiments, the switching assembly is configured as a single reversing valve.

In some embodiments, the switching assembly includes: a hollow shell and a sliding block slidably disposed within the shell, the shell defines first to sixth connection ports therein, the first connection port, the third connection port and the fifth connection port are formed in a side wall of the shell in a sliding direction of the sliding block and spaced from one another, the third connection port is located between the first connection port and the fifth connection port, the second connection port, the fourth connection port and the sixth connection port are formed in a side wall of the shell in the sliding direction of the sliding block and spaced from one another, the fourth connection port is located between the second connection port and the sixth connection port, a first channel and a second channel spaced from each other are formed in the sliding block, the first channel is communicated with the third connection port, the second channel is communicated with the fourth connection port, the first connection port is configured as the first port, the second connection port is configured as the second port, the third connection port is configured as the third port, the fourth connection port is configured as the fourth port, the fifth connection port is configured as the fifth port and the sixth connection port is configured as the sixth port.

In some embodiments, the switching assembly includes: a hollow shell and a sliding block slidably disposed within the shell, the shell defines first to sixth connection ports therein, the first connection port, the third connection port and the fifth connection port are formed in a side wall of the shell in a sliding direction of the sliding block and spaced from one another, the third connection port is located between the first connection port and the fifth connection port, the second connection port, the fourth connection port and the sixth connection port are formed in a side wall of the shell in the sliding direction of the sliding block and spaced from one another, the fourth connection port is located between the second connection port and the sixth connection port, a first channel and a second channel spaced from each other are formed in the sliding block, the first channel is communicated with the third connection port, the second channel is communicated with the fourth connection port, the first connection port is configured as the fourth port, the second connection port is configured as the third port, the third connection port is configured as the second port, the fourth connection port is configured as the first port, the fifth connection port is configured as the fifth port and the sixth connection port is configured as the sixth port.

In some embodiments, the switching assembly includes: a hollow shell and a sliding block slidably disposed within the shell, the shell defines first to sixth connection ports therein, the first connection port, the third connection port and the fifth connection port are formed in a side wall of the shell in a sliding direction of the sliding block and spaced from one another, the third connection port is located between the first connection port and the fifth connection port, the second connection port, the fourth connection port and the sixth connection port are formed in a side wall of the shell in the sliding direction of the sliding block and spaced from one another, the fourth connection port is located between the second connection port and the sixth connection port, a first channel and a second channel spaced from each other are formed in the sliding block, the first channel is communicated with the third connection port, the second channel is communicated with the fourth connection port, the first connection port is configured as the first port, the second connection port is configured as the second port, the third connection port is configured as the sixth port, the fourth connection port is configured as the fifth port, the fifth connection port is configured as the fourth port and the sixth connection port is configured as the third port.

The multi-split air-conditioner according to embodiments of the present invention includes an outdoor unit system of a multi-split air-conditioner according to above embodiments of the present invention.

With the multi-split air-conditioner according to embodiments of the present invention, by disposing the above outdoor unit system, the complexity of the multi-split air-conditioner is significantly reduced and the multi-split air-conditioner has a simple structure.

Additional aspects and advantages of embodiments of present invention will be given in part in the following descriptions, become apparent in part from the following descriptions, or be learned from the practice of the embodiments of the present invention.

BRIEF DESCRIPTION OF THE DRAWINGS

These and other aspects and advantages of embodiments of the present invention will become apparent and more readily appreciated from the following descriptions made with reference to the accompanying drawings, in which.

DETAILED DESCRIPTION

Reference will be made in detail to embodiments of the present invention, and examples of the embodiments are illustrated in drawings. The embodiments described herein with reference to drawings are explanatory, illustrative, and used to generally understand the present invention. The embodiments shall not be construed to limit the present invention.

In the specification, unless specified or limited otherwise, relative terms such as "central", "longitudinal", "lateral", "length", "width", "thickness", "up", "down", "front", "rear", "right", "left", "vertical", "horizontal", "top", "bottom", "inner", "outer", "axial", "radial", "circumferential" as well as derivative thereof should be construed to refer to the orientation as then described or as shown in the drawings under discussion. These relative terms are for convenience of description and do not require that the present invention be constructed or operated in a particular orientation.

In addition, terms such as "first" and "second" are used herein for purposes of description and are not intended to indicate or imply relative importance or significance. Thus, the feature defined with "first" and "second" may comprise one or more this feature.

In the description of the present invention, unless specified or limited otherwise, it should be noted that, terms "mounted," "connected" and "coupled" may be understood broadly, such as permanent connection or detachable connection, or integration; mechanical connection, electronic connection or connection with communication therebetween; direct connection or indirect connection via intermediary, inner communication or interaction between two elements. These having ordinary skills in the art should understand the specific meanings in the present invention according to specific situations.

An outdoor unit system 100 of a multi-split air-conditioner according to embodiments of the present invention will be described in the following with reference to FIGS. 1-13, the outdoor unit system 100 and an indoor unit are assembled together to form the multi-split air-conditioner which has a refrigerating mode and a heating mode.

As shown in FIGS. 1-13, the outdoor unit system 100 of the multi-split air-conditioner according to embodiments of the present invention includes: a compressor 1, an outdoor heat exchanger 2 and a switching assembly 3. The compressor 1 has a gas outlet a and a gas inlet b. It should be noted that structure and working principle of the compressor 1 are known in the related art, which are omitted herein.

The outdoor heat exchanger 2 has an inlet c and an outlet d. The switching assembly 3 has a first port e, a second port f, a third port g, a fourth port h, a fifth port i and a sixth port j. The first port e is connected with the gas outlet a of the compressor 1, the second port f is connected with the gas inlet b of the compressor 1, the third port g is connected with the inlet c of the outdoor heat exchanger 2, the fourth port h is connected with the outlet d of the outdoor heat exchanger 2, the fifth port i is connected with an inlet pipe 4 and the sixth port j is connected with an outlet pipe 5.

The inlet pipe 4 and the outlet pipe 5 are connected with the indoor unit respectively. Refrigerant flowing out of the indoor unit flows into the outdoor unit system 100 through the inlet pipe 4, and refrigerant flowing out of the outdoor unit system 100 flows into the indoor unit through the outlet pipe 5.

When the multi-split air-conditioner is in the refrigerating mode, the first port e and the third port g of the switching assembly 3 are communicated with each other, the fourth port h and the sixth port j of the switching assembly 3 are communicated with each other, and the second port f and the fifth port i of the switching assembly 3 are communicated with each other. The refrigerant discharged from the compressor 1 flows into the switching assembly 3 through the first port e, and is further discharged into the outdoor heat exchanger 2 through the third port g. The refrigerant discharged from the outdoor heat exchanger 2 flows into the switching assembly 3 through the fourth port h, and is further discharged into the outlet pipe 5 through the sixth port j so as to flow into the indoor unit. The refrigerant discharged from the indoor unit flows into the switching assembly 3 through the inlet pipe 4 and the fifth port i, and is finally discharged back into the compressor 1 through the second port f of the switching assembly 3.

When the multi-split air-conditioner is in the heating mode, the first port e and the sixth port j of the switching assembly 3 are communicated with each other, the second port f and the fourth port h of the switching assembly 3 are communicated with each other, and the third port g and the fifth port i of the switching assembly 3 are communicated with each other. The refrigerant discharged from the compressor 1 flows into the switching assembly 3 through the first port e, and then is discharged into the outlet pipe 5 through the sixth port j so as to flow into the indoor unit. The refrigerant discharged from the indoor unit flows into the switching assembly 3 through the inlet pipe 4 and the fifth port i, and is further discharged into the outdoor heat exchanger 2 through the third port g. The refrigerant discharged from the outdoor heat exchanger 2 flows into the switching assembly 3 through the fourth port h, and is further discharged back into the compressor 1 through the second port f of the switching assembly 3.

It should be noted that the switching assembly 3 may be configured as any structure as long as it is ensured that when the multi-split air-conditioner is in the refrigerating mode, the first port e and the third port g of the switching assembly 3 are communicated with each other, the fourth port h and the sixth port j of the switching assembly 3 are communicated with each other, and the second port f and the fifth port i of the switching assembly 3 are communicated with each other; and when the multi-split air-conditioner is in the heating mode, the first port e and the sixth port j of the switching assembly 3 are communicated with each other, the second port f and the fourth port h of the switching assembly 3 are communicated with each other, and the third port g and the fifth port i of the switching assembly 3 are communicated with each other.

With the outdoor unit system 100 according to embodiments of the present invention, by disposing the switching assembly 3 which includes the first to sixth ports, when it is in the refrigerating mode, the first port e and the third port g of the switching assembly 3 are communicated with each other, the fourth port h and the sixth port j of the switching assembly 3 are communicated with each other, and the second port f and the fifth port i of the switching assembly 3 are communicated with each other; when it is in the heating mode, the first port e and the sixth port j of the switching assembly 3 are communicated with each other, the second port f and the fourth port h of the switching assembly 3 are communicated with each other, and the third port g and the fifth port i of the switching assembly 3 are communicated with each other, and thus without changing refrigerant flow directions in inlet and outlet pipes, the outdoor heat exchanger 2 can be switched to connect with the gas outlet a or gas inlet b of the compressor 1 in the refrigerating or heating process, and the refrigerant flow direction in the inlet c of the outdoor heat exchanger 2 is not changed either. Therefore, the complexity of the outdoor unit system 100 is significantly reduced and the outdoor unit system 100 has a simple structure.

The outdoor unit system 100 according to a first embodiment of the present invention will be described in the following with reference to FIGS. 1 and 2.

Figure 1:
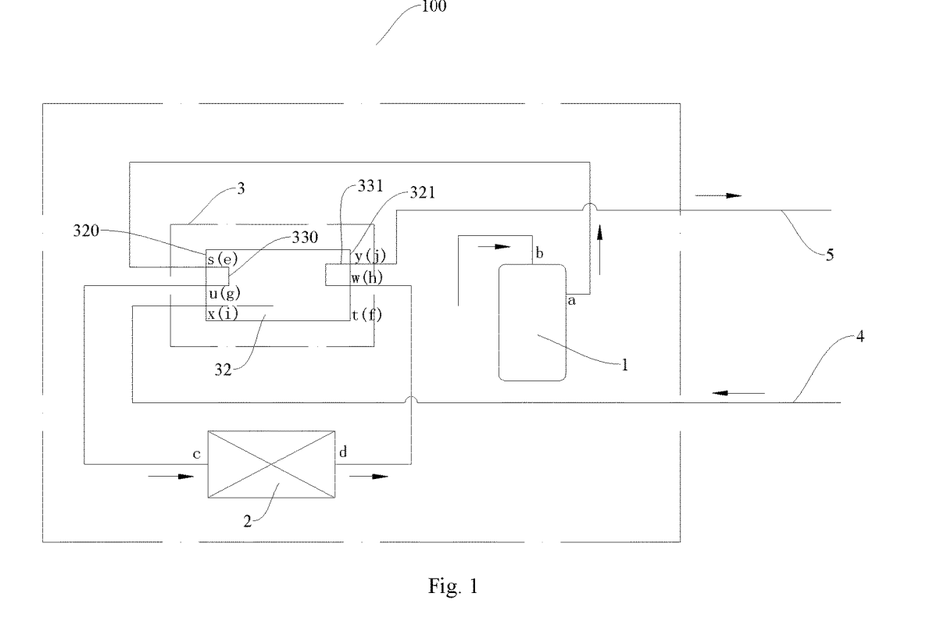
FIG. 1 is a schematic view of an outdoor unit system according to a first embodiment of the present invention, in which a multi-split air-conditioner is in a refrigerating mode.
Figure 2:
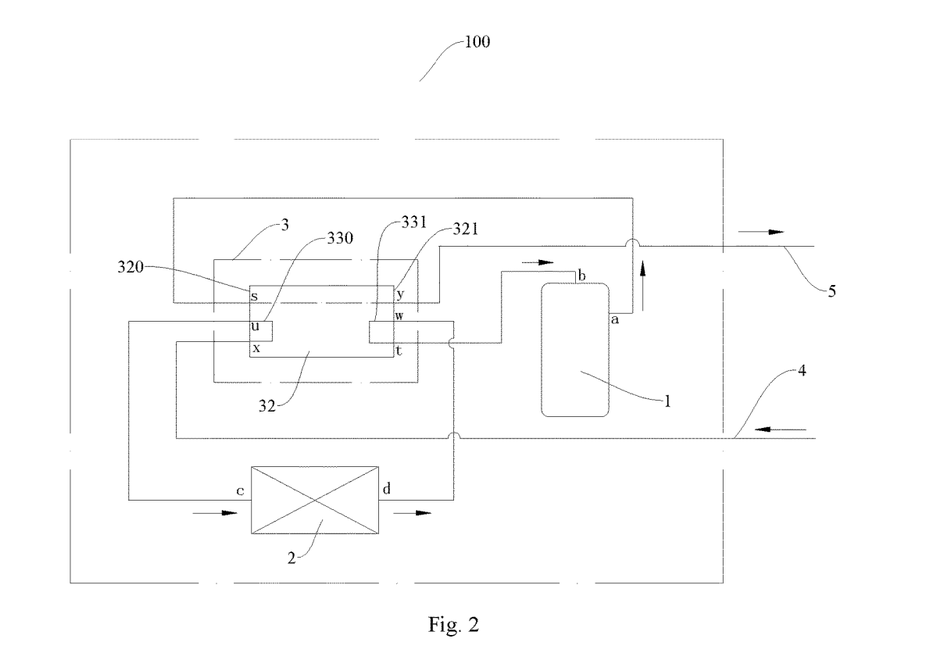
FIG. 2 is a schematic view of an outdoor unit system according to a first embodiment of the present invention, in which a multi-split air-conditioner is in a heating mode.

In the embodiment, as shown in FIGS. 1 and 2, the outdoor unit system 100 includes a compressor 1, an outdoor heat exchanger 2, a switching assembly 3, an inlet pipe 4 and an outlet pipe 5.

The switching assembly 3 may be configured as a single reversing valve. The switching assembly 3 includes: a hollow shell 32 and a sliding block movably disposed within the shell 32. The shell 32 defines a first connection port s, a second connection port t, a third connection port u, a fourth connection port w, a fifth connection port x and a sixth connection port y. The first connection port s, the third connection port u and the fifth connection port x are formed in a side wall of the shell 32 in a sliding direction of the sliding block and spaced from one another, and the third connection port u is located between the first connection port s and the fifth connection port x. The second connection port t, the fourth connection port w and the sixth connection port y are formed in a side wall of the shell 32 in the sliding direction of the sliding block and spaced from one another, and the fourth connection port w is located between the second connection port t and the sixth connection port y.

As shown in FIGS. 1 and 2, the shell 32 includes a first side wall 320 and a second side wall 321 opposite to each other. The first connection port s, the third connection port u and the fifth connection port x are formed in the first side wall 320, and the second connection port t, the fourth connection port w and the sixth connection port y are formed in the second side wall 321. Certainly, it should be understood that, the first side wall 320 and the second side wall 321 may define an included angle therebetween, or the shell 32 may be configured to have another shape such as a cylinder, as long as the first connection port s, the third connection port u and the fifth connection port x are formed in the side wall of the shell 32 in the sliding direction of the sliding block and spaced from one another, and the second connection port t, the fourth connection port w and the sixth connection port y are formed in the side wall of the shell 32 in the sliding direction of the sliding block and spaced from one another.

A first channel 330 and a second channel 331 spaced from each other are defined in the sliding block. The first channel 330 is always communicated with the third connection port u and may be communicated with one of the first connection port s and the fifth connection port x. The second channel 331 is always communicated with the fourth connection port w and may be communicated with one of the second connection port t and the sixth connection port y. When the first channel 330 is communicated with one of the first connection port s and the fifth connection port x and the second channel 331 is communicate with one of the second connection port t and the sixth connection port y, the other one of the first connection port s and the fifth connection port x is communicated with the other one of the second connection port t and the sixth connection port y.

In the embodiment, the first connection port s is configured as the first port e, the second connection port t is configured as the second port f, the third connection port u is configured as the third port g, the fourth connection port w is configured as the fourth port h, the fifth connection port x is configured as the fifth port i and the sixth connection port y is configured as the sixth port j.

When the multi-split air-conditioner is in the refrigerating mode, as shown in FIG. 1, the sliding block is moved to communicate the first channel 330 with the first connection port s and the second channel 331 with the sixth connection port y, such that the first connection port s is communicated with the third connection port u, the second connection port t is communicated with the fifth connection port x, and the fourth connection port w is communicated with the sixth connection port y.

The refrigerant discharged from compressor 1 flows into first channel 330 of the switching assembly 3 through the first connection port s, and the refrigerant in the first channel 330 is further discharged into the outdoor heat exchanger 2 through the third connection port u. The refrigerant discharged from the outdoor heat exchanger 2 flows into the second channel 331 of the switching assembly 3 through the fourth connection port w, and the refrigerant in the second channel 331 is discharged into the outlet pipe 5 through the sixth connection port y so as to flow into the indoor unit. The refrigerant discharged from the indoor unit flows into the shell 32 of the switching assembly 3 through the inlet pipe 4 and the fifth connection port x, and finally the refrigerant in the shell 32 is discharged back into the compressor 1 through the second connection port t of the switching assembly 3.

When the multi-split air-conditioner is in the heating mode, as shown in FIG. 2, the sliding block is moved to communicate the first channel 330 with the fifth connection port x and the second channel 331 with the second connection port t, such that the first connection port s is communicated with the sixth connection port y, the third connection port u is communicated with the fifth connection port x, and the fourth connection port w is communicated with the second connection port t.

The refrigerant discharged from the compressor 1 flows into the shell 32 of the switching assembly 3 through the first connection port s, and the refrigerant in the shell 32 is further discharged into the outlet pipe 5 through the sixth connection port y so as to flow into the indoor unit. The refrigerant discharged from the indoor unit flows into the first channel 330 of the switching assembly 3 through the inlet pipe 4 and the fifth connection port x, and the refrigerant in the first channel 330 is discharged into the outdoor heat exchanger 2 through the third connection port u. The refrigerant discharged from the outdoor heat exchanger 2 flows into the second channel 331 of the switching assembly 3 through the fourth connection port w, the refrigerant in the second channel 331 is discharged back into the compressor 1 through the second connection port t of the switching assembly 3.

The outdoor unit assembly 100 according to a second embodiment of the present invention will be described in the following with reference to FIGS. 3 and 4.

Figure 3:
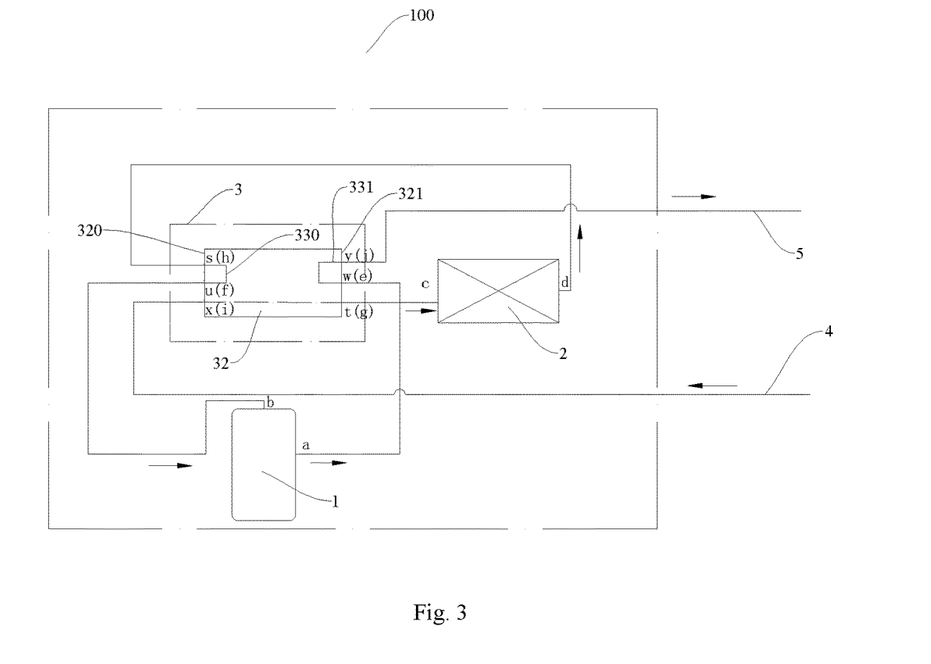
FIG. 3 is a schematic view of an outdoor unit system according to a second embodiment of the present invention, in which a multi-split air-conditioner is in a heating mode.

In the embodiment, a structure of a switching assembly 3 is the same with that of the switching assembly 3 in the above embodiment, but the difference therebetween is that, in the switching assembly 3 herein, the first connection port s is configured as the fourth port h, the second connection port t is configured as the third port g, the third connection port u is configured as the second port f, the fourth connection port w is configured as the first port e, the fifth connection port x is configured as the fifth port i and the sixth connection port y is configured as the sixth port j, as shown in FIG. 3.

When the multi-split air-conditioner is in the heating mode, as shown in FIG. 3, the sliding block is moved to communicate the first channel 330 with the first connection port s and the second channel 331 with the sixth connection port y, such that the first connection port s is communicated with the third connection port u, the second connection port t is communicated with the fifth connection port x, and the fourth connection port w is communicated with the sixth connection port y.

The refrigerant discharged from the compressor 1 flows into the second channel 331 of the switching assembly 3 through the fourth connection port w, and the refrigerant in the second channel 331 is further discharged into the outlet pipe 5 through the sixth connection port y so as to flow into the indoor unit. The refrigerant discharged from indoor unit flows into the shell 32 of the switching assembly 3 through the inlet pipe 4 and the fifth connection port x, and the refrigerant in the shell 32 is further discharged into outdoor heat exchanger 2 through the second connection port t. The refrigerant discharged from the outdoor heat exchanger 2 flows into the first channel 330 of the assembly 3 through the first connection port s, and the refrigerant in the first channel 330 is discharged back into the compressor 1 through the third connection port u.

Figure 4:
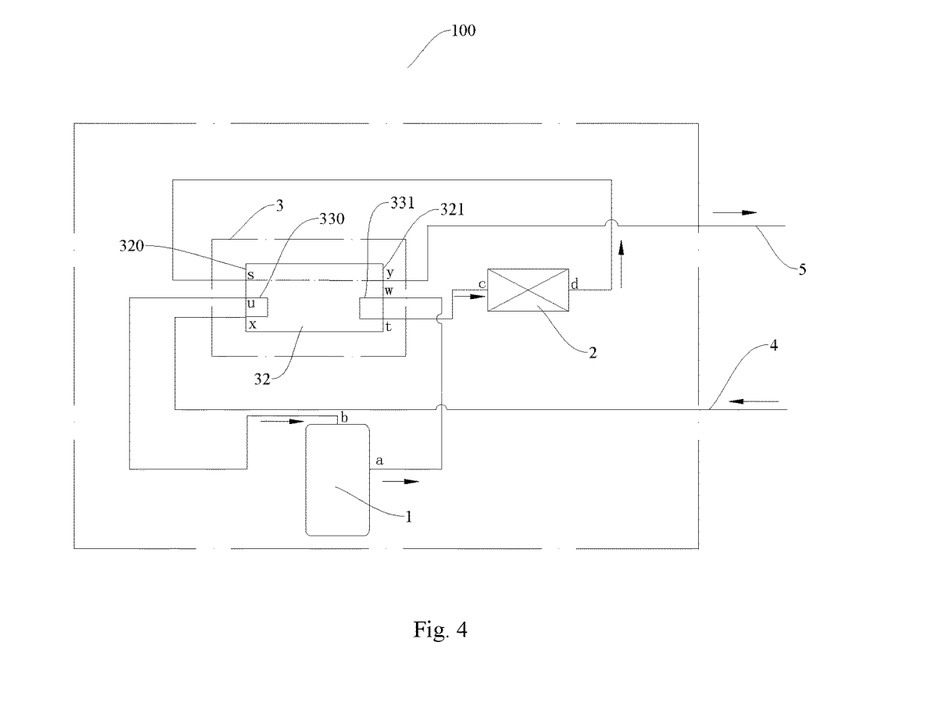
FIG. 4 is a schematic view of an outdoor unit system according to a second embodiment of the present invention, in which a multi-split air-conditioner is in a refrigerating mode.

When the multi-split air-conditioner is in the refrigerating mode, as shown in FIG. 4, the sliding block is moved to communicate the first channel 330 with the fifth connection port x and the second channel 331 with the second connection port t, such that the first connection port s is communicated with the sixth connection port y, the third connection port u is communicated with the fifth connection port x, and the fourth connection port w is communicated with the second connection port t.

The refrigerant discharged from the compressor 1 flows into the second channel 331 of the switching assembly 3 through the fourth connection port w, and the refrigerant in the second channel 331 is further discharged into the outdoor heat exchanger 2 through the second connection port t. The refrigerant discharged from the outdoor heat exchanger 2 flows into the shell 32 of the switching assembly 3 through the first connection port s, and the refrigerant in the shell 32 is further discharged into the outlet pipe 5 through the sixth connection port y so as to flow into the indoor unit. The refrigerant discharged from the indoor unit flows into the first channel 330 of the switching assembly 3 through the inlet pipe 4 and the fifth connection port x, and the refrigerant in the first channel 330 is discharged back into the compressor 1 through the third connection port u.

The outdoor unit system 100 according to a third embodiment of the present invention will be described in the following with reference to FIGS. 5 and 6.

In the embodiment, a structure of a switching assembly 3 is the same with that of the switching assembly 3 in the above embodiment, but the difference therebetween is that, in the switching assembly 3 herein, the first connection port s is configured as the first port e, the second connection port t is configured as the second port f, the third connection port u is configured as the sixth port j, the fourth connection port w is configured as the fifth port i, the fifth connection port x is configured as the fourth port h, and the sixth connection port y is configured as the third port g.

Figure 5:
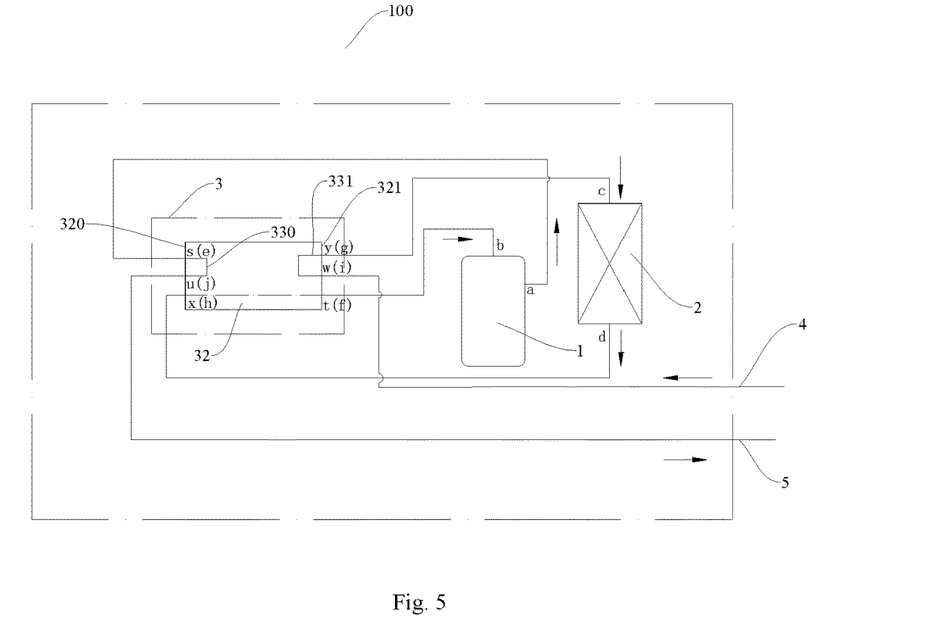
FIG. 5 is a schematic view of an outdoor unit system according to a third embodiment of the present invention, in which a multi-split air-conditioner is in a heating mode.

When the multi-split air-conditioner is in the heating mode, as shown in FIG. 5, the sliding block is moved to communicate the first channel 330 with the first connection port s and the second channel 331 with the sixth connection port y, such that the first connection port s is communicated with the third connection port u, the second connection port t is communicated with the fifth connection port x, and the fourth connection port w is communicated with the sixth connection port y.

The refrigerant discharged from the compressor 1 flows into the first channel 330 of the switching assembly 3 through the first connection port s, and the refrigerant in the first channel 330 is further discharged into the outlet pipe 5 through the third connection port u so as to flow into the indoor unit. The refrigerant discharged from the indoor unit flows into the second channel 331 of the switching assembly 3 through the inlet pipe 4 and the fourth connection port w, and the refrigerant in the second channel 331 is further discharged into the outdoor heat exchanger 2 through the sixth connection port y. The refrigerant discharged from the outdoor heat exchanger 2 flows into the shell 32 of the switching assembly 3 through the fifth connection port x, and the refrigerant in the shell 32 is discharged back into the compressor 1 through the second connection port t.

Figure 6:
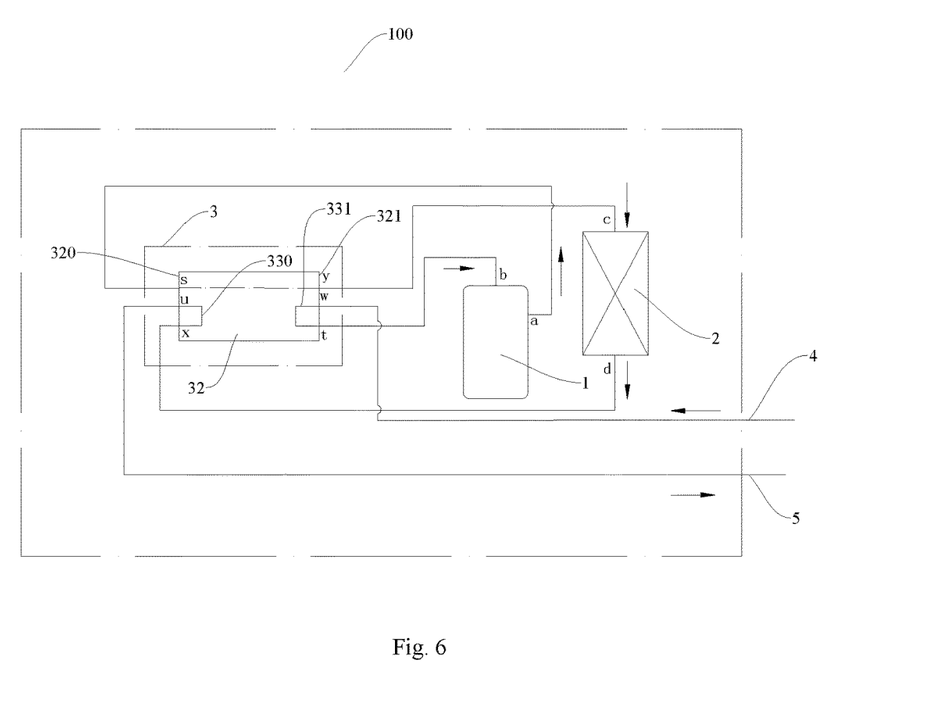
FIG. 6 is a schematic view of an outdoor unit system according to a third embodiment of the present invention, in which a multi-split air-conditioner is in a refrigerating mode.

When the multi-split air-conditioner is in the refrigerating mode, as shown in FIG. 6, the sliding block is moved to communicate the first channel 330 with the fifth connection port x and the second channel 331 with the second connection port t, such that the first connection port s is communicated with the sixth connection port y, the third connection port u is communicated with the fifth connection port x, and the fourth connection port w is communicated with the second connection port t.

The refrigerant discharged from the compressor 1 flows into the shell 32 of the switching assembly 3 through the first connection port s, and the refrigerant in the shell 32 is further discharged into the outdoor heat exchanger 2 through the sixth connection port y. The refrigerant discharged from the outdoor heat exchanger 2 flows into the first channel 330 of the switching assembly 3 through the fifth connection port x, and the refrigerant in the first channel 330 is further discharged into the outlet pipe 5 through the third connection port u so as to flow into indoor unit. The refrigerant discharged from the indoor unit flows into the second channel 331 of the switching assembly 3 through the inlet pipe 4 and the fourth connection port w, and the refrigerant in the second channel 331 is further discharged back into the compressor 1 through the second connection port t.

The outdoor unit system according to a fourth embodiment of the present invention will be described in the following with reference to FIGS. 7-9.

Figure 7:
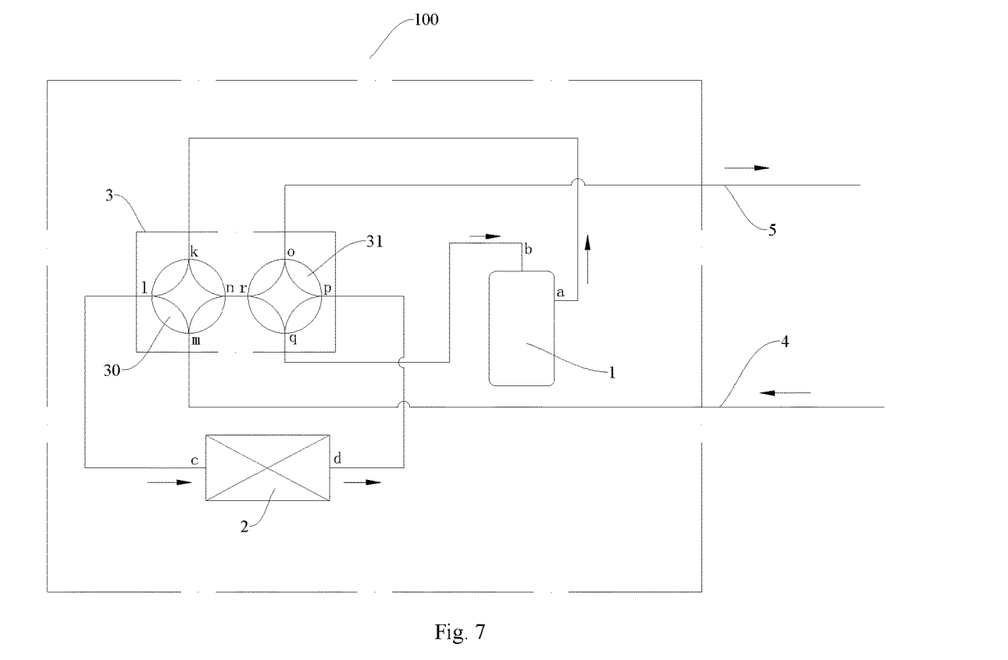
FIG. 7 is a schematic view of an outdoor unit system according to a fourth embodiment of the present invention.
Figure 8:
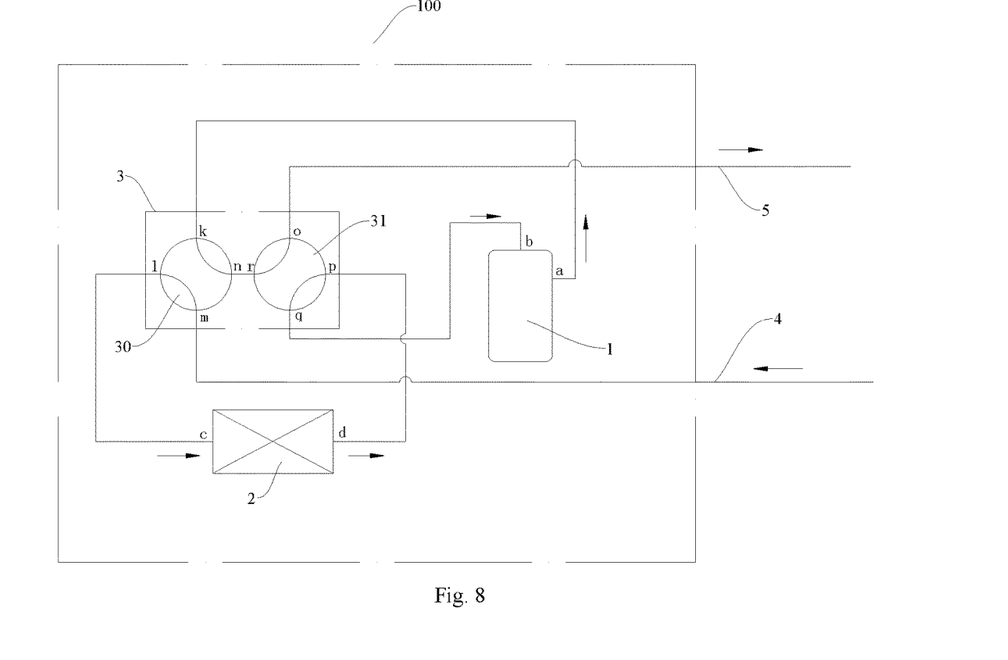
FIG. 8 is a schematic view of the outdoor unit system in FIG. 7 in a heating mode.
Figure 9:
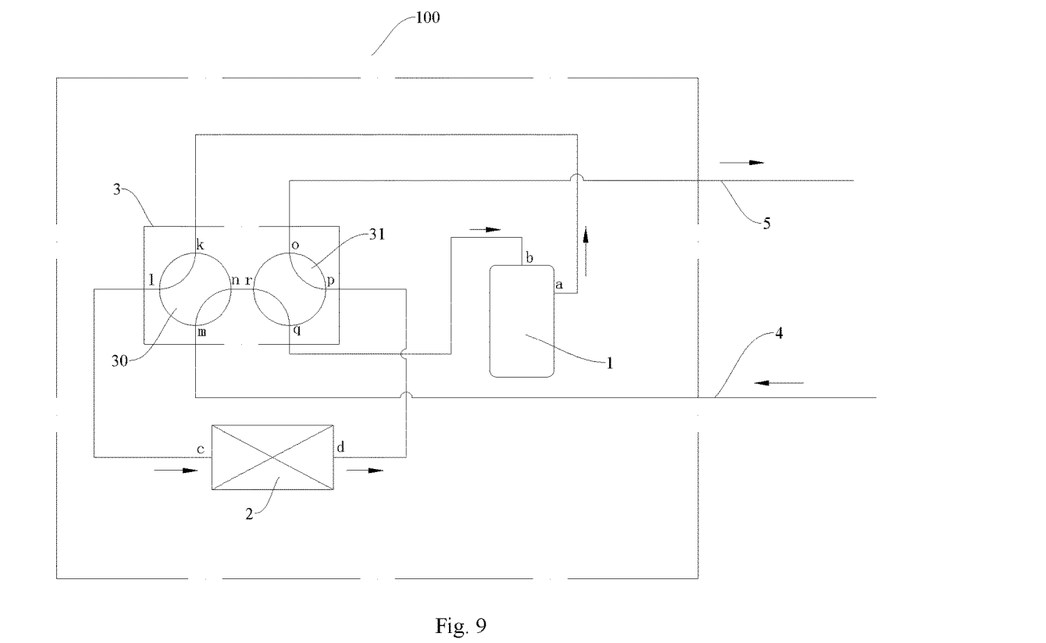
FIG. 9 is a schematic view of the outdoor unit system in FIG. 7 in a refrigerating mode.

In the embodiment, as shown in FIGS. 7-9, the switching assembly 3 includes a first four-way valve 30 and a second four-way valve 31. The first four-way valve 30 has a first valve port k, a second valve port l, a third valve port m and a fourth valve port n. The first valve port k is communicated with one of the second valve port l and the fourth valve port n, the third valve port m is communicated with the other one of the second valve port l and the fourth valve port n.

The second four-way valve 31 includes a fifth valve port o, a sixth valve port p, a seventh valve port q and an eighth valve port r. The fifth valve port o is communicated with one of the sixth valve port p and the eighth valve port r, and the seventh valve port q is communicated with the other one of the sixth valve port p the eighth valve port r.

The fourth valve port n is communicated with the eighth valve port r, the first valve port k is configured as the first port e, the second valve port l is configured as the third port g, the third valve port m is configured as the fifth port i, the fifth valve port o is configured as the sixth port j, the sixth valve port p is configured as the fourth port h, and the seventh valve port q is configured as the second port f.

The first valve port k is connected with the gas outlet a of the compressor 1, the second valve port l is connected with the inlet c of the outdoor heat exchanger 2, the third valve port m is connected with inlet pipe 4, the fifth valve port o is connected with the outlet pipe 5, the sixth valve port p is connected with the outlet d of the outdoor heat exchanger 2, the seventh valve port q is connected with the gas inlet b of the compressor 1.

When the multi-split air-conditioner is in the heating mode, as shown in FIG. 8, in the first four-way valve 30, the first valve port k is communicated with the fourth valve port n and the second valve port l is communicated with third valve port m, and in the second four-way valve 31, the fifth valve port o is communicated with the eighth valve port r and the sixth valve port p is communicated with the seventh valve port q. As indicated by arrows in FIG. 8, the refrigerant discharged from the gas outlet a of the compressor 1 flows into the outlet pipe 5 through the first valve port k and fourth valve port n of the first four-way valve 30 and the eighth valve port r and fifth valve port o of the second four-way valve 31, and the refrigerant in the outlet pipe 5 is further discharged into the indoor unit. The refrigerant discharged from the indoor unit flows into the outdoor heat exchanger 2 through the inlet pipe 4 and the third valve port m and second valve port l of the first four-way valve 30, and the refrigerant discharged from the outdoor heat exchanger 2 flows back into the compressor 1 through the sixth valve port p and seventh valve port q of the second four-way valve 31 and the gas inlet b.

When the multi-split air-conditioner is in the refrigerating mode, as shown in FIG. 9, in the first four-way valve 30, the first valve port k is communicated with the second valve port l and the third valve port m is communicated with the fourth valve port n, and in the second four-way valve 31, the fifth valve port o is communicated with the sixth valve port p and the seventh valve port q is communicated with the eighth valve port r. As indicated by arrows in FIG. 9, the refrigerant discharged from the gas outlet a of the compressor 1 flows into the outdoor heat exchanger 2 through the first valve port k and second valve port 1 of the first four-way valve 30, and the refrigerant discharged from the outdoor heat exchanger 2 flows into the outlet pipe 5 through the sixth valve port p and fifth valve port o of the second four-way valve 31. The refrigerant in the outlet pipe 5 is further discharged into the indoor unit. The refrigerant discharged from the indoor unit flows back into the compressor 1 through the inlet pipe 4, the third valve port m and fourth valve port n of the first four-way valve 30, the eighth valve port r and seventh valve port q of the second four-way valve 31 and the gas inlet b.

The outdoor unit system according to a fifth embodiment of the present invention will be described in the following with reference to FIGS. 10 and 11.

Figure 10:
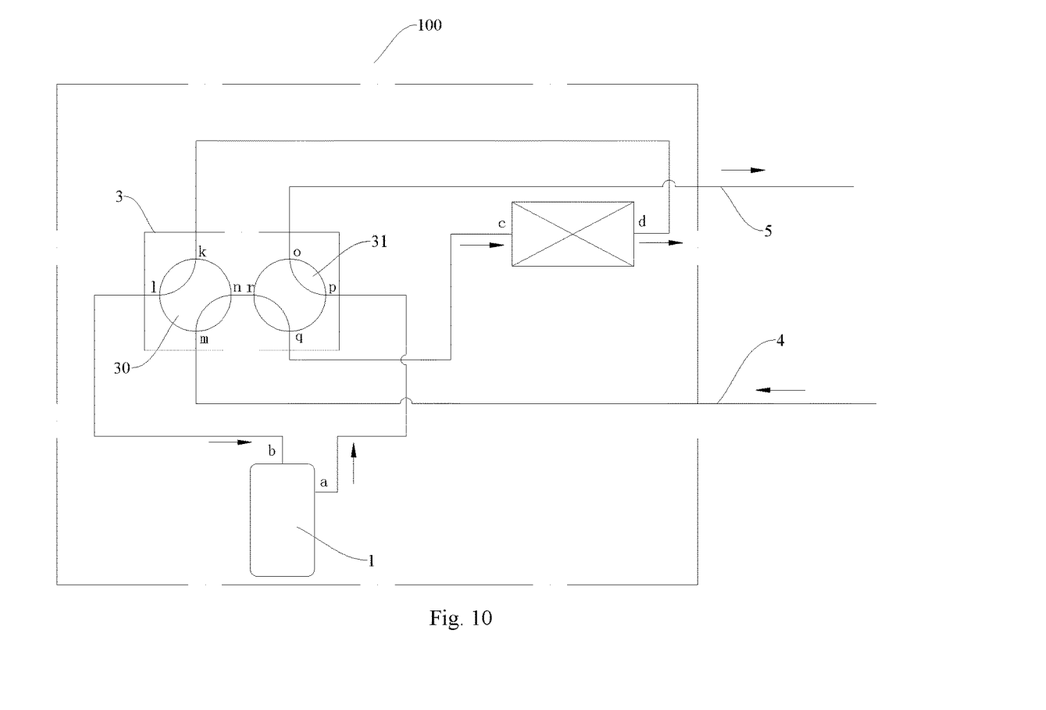
FIG. 10 is a schematic view of an outdoor unit system according to a fifth embodiment of the present invention, in which a multi-split air-conditioner is in a heating mode.
Figure 11:
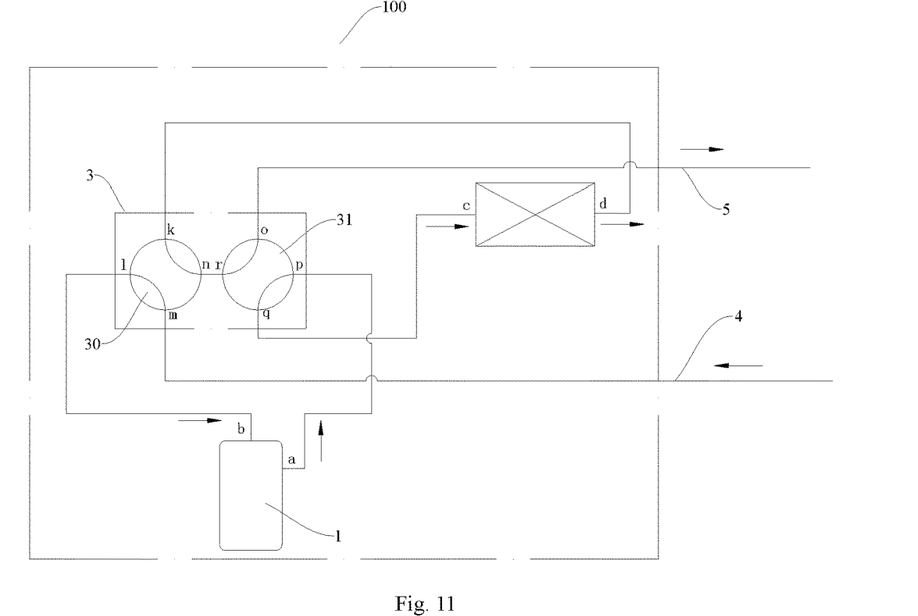
FIG. 11 is a schematic view of an outdoor unit system according to a fifth embodiment of the present invention, in which a multi-split air-conditioner is in a refrigerating mode.

As shown in FIGS. 10 and 11, in the embodiment, the switching assembly 3 includes a first four-way valve 30 and a second four-way valve 31. The first four-way valve 30 has a first valve port k, a second valve port l, a third valve port m and a fourth valve port n. The first valve port k is communicated with one of the second valve port l and the fourth valve port n, and the third valve port m is communicated with the other one of the second valve port l and the fourth valve port n.

The second four-way valve 31 has a fifth valve port o, a sixth valve port p, a seventh valve port q and a eighth valve port r. The fifth valve port o is communicated with one of the sixth valve port p and the eighth valve port r, and the seventh valve port q is communicated with the other one of the sixth valve port p and the eighth valve port r.

The fourth valve port n is connected with the eighth valve port r, the first valve port k is configured as the fourth port h, the second valve port l is configured as the second port f, the third valve port m is configured as the fifth port i, the fifth valve port o is configured as the sixth port j, the sixth valve port p is configured as the first port e, and the seventh valve port q is configured as the third port g.

The first valve port k is connected with the outlet d of the outdoor heat exchanger 2, the second valve port l is connected with the gas inlet b of the compressor 1, the third valve port m is connected with the inlet pipe 4, the fifth valve port o is connected with the outlet pipe 5, the sixth valve port p is connected with the gas outlet a of the compressor 1, and the seventh valve port q is connected with the inlet c of the outdoor heat exchanger 2.

When the multi-split air-conditioner is in the heating mode, as shown in FIG. 10, in the first four-way valve 30, the first valve port k is communicated with the second valve port l and the third valve port m is communicated with the fourth valve port n, and in the second four-way valve 31, the fifth valve port o is communicated with the sixth valve port p and the seventh valve port q is communicated with the eighth valve port r. As indicated by arrows in FIG. 10, the refrigerant discharged from the gas outlet a of the compressor 1 flows into the outlet pipe 5 through the sixth valve port p and fifth valve port o of the second four-way valve 31, and the refrigerant in the outlet pipe 5 is further discharged into indoor unit. The refrigerant discharged from the indoor unit flows into outdoor heat exchanger 2 through the inlet pipe 4, the third valve port m and fourth valve port n of the first four-way valve 30, the eighth valve port r and seventh valve port q of the second four-way valve 31, and the refrigerant discharged from the outdoor heat exchanger 2 flows back into the compressor 1 through the first valve port k and second valve port l of the first four-way valve 30 and the gas inlet b.

When the multi-split air-conditioner is in the refrigerating mode, as shown in FIG. 11, in the first four-way valve 30, the first valve port k is communicated with the fourth valve port n and the second valve port l is communicated with the third valve port m, and in the second four-way valve 31, the fifth valve port o is communicated with the eighth valve port r and the sixth valve port p is communicated with the seventh valve port q. As indicated by arrows in FIG. 11, the refrigerant discharged from the gas outlet a of the compressor 1 flows into the outdoor heat exchanger 2 through the sixth valve port p and seventh valve port q of the second four-way valve 31, and the refrigerant discharged from the outdoor heat exchanger 2 flows into the outlet pipe 5 through the first valve port k and fourth valve port n of the first four-way valve 30 and the eighth valve port r and fifth valve port o of the second four-way valve 31, and the refrigerant in the outlet pipe 5 is further discharged into the indoor unit. The refrigerant discharged from the indoor unit flows back into the compressor 1 through the inlet pipe 4, the third valve port m and second valve port l of the first four-way valve 30 and the gas inlet b.

The outdoor unit system according to a sixth embodiment of the present invention will be described in the following with reference to FIGS. 12 and 13.

Figure 12:
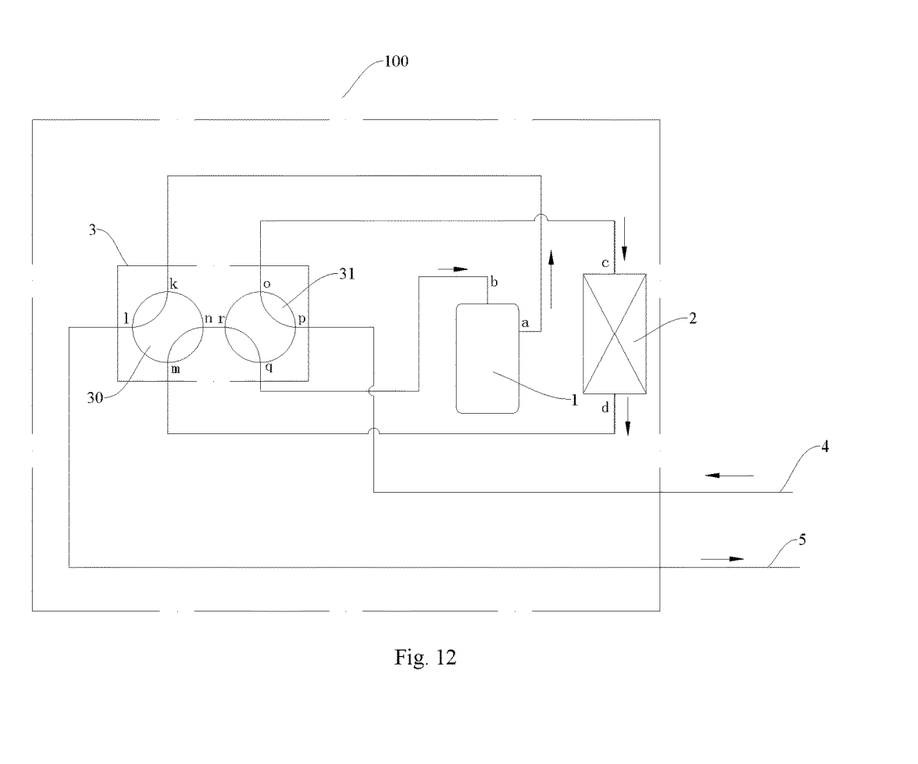
FIG. 12 is a schematic view of an outdoor unit system according to a sixth embodiment of the present invention, in which a multi-split air-conditioner is in a heating mode.
Figure 13:
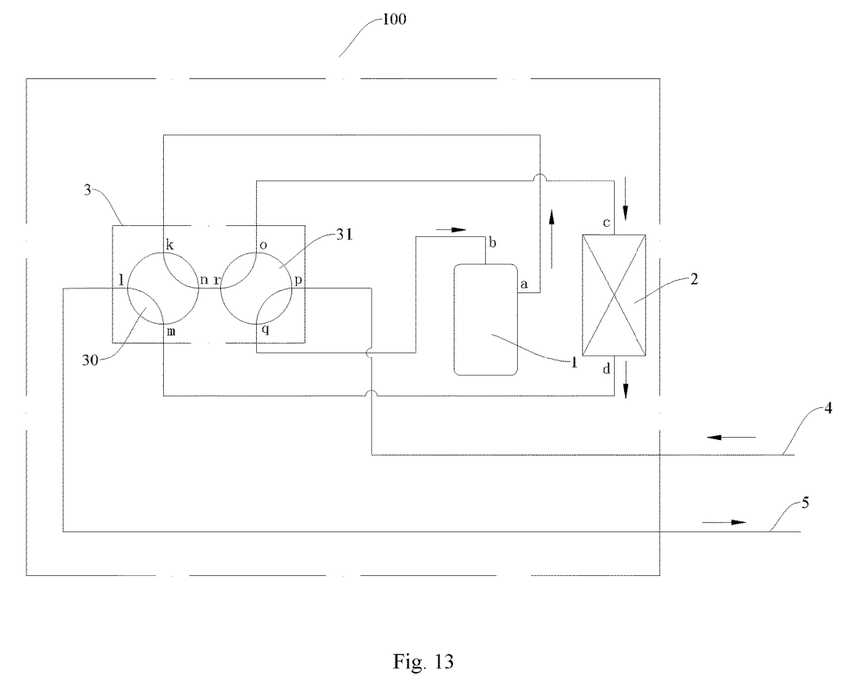
FIG. 13 is a schematic view of an outdoor unit system according to a sixth embodiment of the present invention, in which a multi-split air-conditioner is in a refrigerating mode.

In the embodiment, as shown in FIGS. 12 and 13, the switching assembly 3 includes a first four-way valve 30 and a second four-way valve 31. The first four-way valve 30 has a first valve port k, a second valve port l, a third valve port m and a fourth valve port n. The first valve port k is communicated with one of the second valve port l and the fourth valve port n, and the third valve port m is communicated with the other one of second valve port l and the fourth valve port n.

The second four-way valve 31 has a fifth valve port o, a sixth valve port p, a seventh valve port q and an eighth valve port r. The fifth valve port o is communicated with one of the sixth valve port p and the eighth valve port r, and the seventh valve port q is communicated with the other one of the sixth valve port p and the eighth valve port r.

The fourth valve port n is connected with the eighth valve port r, the first valve port k is configured as the first port e, the second valve port l is configured as the sixth port j, the third valve port m is configured as the fourth port h, the fifth valve port o is configured as the third port g, the sixth valve port p is configured as the fifth port i, and the seventh valve port q is configured as the second port f.

The first valve port k is connected with the gas outlet a of the compressor 1, the second valve port l is connected with the outlet pipe 5, the third valve port m is connected with the outlet d of the outdoor heat exchanger 2, the fifth valve port o is connected with the inlet c of the outdoor heat exchanger 2, the sixth valve port p is connected with the inlet pipe 4, and the seventh valve port q is connected with the gas inlet b of the compressor 1.

When the multi-split air-conditioner is in the heating mode, as shown in FIG. 12, in the first four-way valve 30, the first valve port k is communicated with the second valve port l and the third valve port m is communicated with the fourth valve port n, in the second four-way valve 31, the fifth valve port o is communicated with the sixth valve port p and the seventh valve port q is communicated with the eighth valve port r. As indicated by arrows in FIG. 12, the refrigerant discharged from the gas outlet a of the compressor 1 flows into the outlet pipe 5 through the first valve port k and second valve port l of the first four-way valve 30, and the refrigerant in the outlet pipe 5 is further discharged into the indoor unit. The refrigerant discharged from the indoor unit flows into the outdoor heat exchanger 2 through the inlet pipe 4, and the sixth valve port p and fifth valve port o of the second four-way valve 31, and the refrigerant discharged from the outdoor heat exchanger 2 flows back into the compressor 1 through the third valve port m and fourth valve port n of the first four-way valve 30, the eighth valve port r and seventh valve port q of the second four-way valve 31 and the gas inlet b.

When the multi-split air-conditioner is in the refrigerating mode, as shown in FIG. 13, in the first four-way valve 30, the first valve port k is communicated with the fourth valve port n and the second valve port l is communicated with the third valve port m, in the second four-way valve 31, the fifth valve port o is communicated with the eighth valve port r and the sixth valve port p is communicated with the seventh valve port q. As indicated by arrows in FIG. 13, the refrigerant discharged from the gas outlet a of the compressor 1 flows into outdoor heat exchanger 2 through the first valve port k and fourth valve port n of the first four-way valve 30, the eighth valve port r and fifth valve port o of the second four-way valve 31, the refrigerant discharged from the outdoor heat exchanger 2 flows into outlet pipe 5 through the third valve port m and second valve port l of the first four-way valve 30, and the refrigerant in the outlet pipe 5 flows into the indoor unit. The refrigerant discharged from the indoor unit flows back into the compressor 1 through inlet pipe 4, the sixth valve port p and seventh valve port q of the second four-way valve 31 and the gas inlet b.

It should be noted that, in the above fourth to sixth embodiments, the first four-way valve 30 and the second four-way valve 31 may implement a switching action in any manner. In some embodiments of the present disclosure, the first four-way valve 30 and the second four-way valve 31 share a reversing capillary which is communicated with the gas outlet a of the compressor 1. In other words, the reversing capillary of one of the first four-way valve 30 and the second four-way valve 31 connected with the gas outlet a of the compressor 1 also acts in the other one of the first four-way valve 30 and the second four-way valve 31, so as to ensure that both the first four-way valve 30 and the second four-way valve 31 can implement the switching action. It should also be noted that structure and working principle of the four-way valve is known in the related art, which is omitted herein.

The multi-split air-conditioner according to embodiments of the present invention includes the outdoor unit system 100 according to above embodiments of the present invention.

With the multi-split air-conditioner according to embodiments of the present invention, by disposing the above outdoor unit system 100, the complexity of the multi-split air-conditioner is significantly reduced and the multi-split air-conditioner has a simple structure.

In the description of the present disclosure, a structure in which a first feature is "on" a second feature may include an embodiment in which the first feature directly contacts the second feature, and may also include an embodiment in which an additional feature is formed between the first feature and the second feature so that the first feature does not directly contact the second feature, unless specified otherwise. Furthermore, a first feature "on," "above," or "on top of" a second feature may include an embodiment in which the first feature is right "on," "above," or "on top of" the second feature, and may also include an embodiment in which the first feature is not right "on," "above," or "on top of" the second feature, or just means that the first feature is at a height higher than that of the second feature. While a first feature "beneath," "below," or "on bottom of" a second feature may include an embodiment in which the first feature is right "beneath," "below," or "on bottom of" the second feature, and may also include an embodiment in which the first feature is not right "beneath," "below," or "on bottom of" the second feature, or just means that the first feature is at a height lower than that of the second feature.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present invention. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present invention. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present invention, and changes, alternatives, and modifications can be made in the embodiments without departing from spirit, principles and scope of the present invention.

What is claimed is:

1. An outdoor unit system of a multi-split air-conditioner, comprising:
    a compressor having a gas outlet and a gas inlet;
    an outdoor heat exchanger having an inlet and an outlet;
    a switching assembly having first to sixth ports, wherein the first port is connected with the gas outlet of the compressor, the second port is connected with the gas inlet of the compressor, the third port is connected with the inlet of the outdoor heat exchanger, the fourth port is connected with the outlet of the outdoor heat exchanger, the fifth port is connected with an inlet pipe and the sixth port is connected with an outlet pipe,
    wherein the switching assembly comprises a first four-way valve and a second four-way valve, the first four-way valve has first to fourth valve ports, the second four-way valve has fifth to eighth valve ports, the fourth valve port is connected with the eighth valve port, the first to third valve ports and the fifth to seventh valve ports are configured as the first to sixth ports correspondingly.

2. The outdoor unit system according to claim 1, wherein the first valve port is configured as the first port, the second valve port is configured as the third port, the third valve port is configured as the fifth port, the fifth valve port is configured as the sixth port, the sixth valve port is configured as the fourth port and the seventh valve port is configured as the second port.

3. The outdoor unit system according to claim 2, wherein the first four-way valve and the second four-way valve share a switching assembly capillary which is communicated with the gas outlet of the compressor.

4. The outdoor unit system according to claim 2, wherein the switching assembly is configured as a single reversing valve.

5. The outdoor unit system according to claim 4, wherein the switching assembly comprises: a hollow shell and a sliding block slidably disposed within the shell, the shell defines first to sixth connection ports therein, the first connection port, the third connection port and the fifth connection port are formed in a side wall of the shell in a sliding direction of the sliding block and spaced from one another, the third connection port is located between the first connection port and the fifth connection port, the second connection port, the fourth connection port and the sixth connection port are formed in a side wall of the shell in the sliding direction of the sliding block and spaced from one another, the fourth connection port is located between the second connection port and the sixth connection port, a first channel and a second channel spaced from each other are formed in the sliding block, the first channel is communicated with the third connection port, the second channel is communicated with the fourth connection port, the first connection port is configured as the first port, the second connection port is configured as the second port, the third connection port is configured as the third port, the fourth connection port is configured as the fourth port, the fifth connection port is configured as the fifth port and the sixth connection port is configured as the sixth port.

6. The outdoor unit system according to claim 4, wherein the switching assembly comprises: a hollow shell and a sliding block slidably disposed within the shell, the shell defines first to sixth connection ports therein, the first connection port, the third connection port and the fifth connection port are formed in a side wall of the shell in a sliding direction of the sliding block and spaced from one another, the third connection port is located between the first connection port and the fifth connection port, the second connection port, the fourth connection port and the sixth connection port are formed in a side wall of the shell in the sliding direction of the sliding block and spaced from one another, the fourth connection port is located between the second connection port and the sixth connection port, a first channel and a second channel spaced from each other are formed in the sliding block, the first channel is communicated with the third connection port, the second channel is communicated with the fourth connection port, the first connection port is configured as the fourth port, the second connection port is configured as the third port, the third connection port is configured as the second port, the fourth connection port is configured as the first port, the fifth connection port is configured as the fifth port and the sixth connection port is configured as the sixth port.

7. The outdoor unit system according to claim 4, wherein the switching assembly comprises: a hollow shell and a sliding block slidably disposed within the shell, the shell defines first to sixth connection ports therein, the first connection port, the third connection port and the fifth connection port are formed in a side wall of the shell in a sliding direction of the sliding block and spaced from one another, the third connection port is located between the first connection port and the fifth connection port, the second connection port, the fourth connection port and the sixth connection port are formed in a side wall of the shell in the sliding direction of the sliding block and spaced from one another, the fourth connection port is located between the second connection port and the sixth connection port, a first channel and a second channel spaced from each other are formed in the sliding block, the first channel is communicated with the third connection port, the second channel is communicated with the fourth connection port, the first connection port is configured as the first port, the second connection port is configured as the second port, the third connection port is configured as the sixth port, the fourth connection port is configured as the fifth port, the fifth connection port is configured as the fourth port and the sixth connection port is configured as the third port.

8. The outdoor unit system according to claim 1, wherein the first valve port is configured as the fourth port, the second valve port is configured as the second port, the third valve port is configured as the fifth port, the fifth valve port is configured as the sixth port, the sixth valve port is configured as the first port and the seventh valve port is configured as the third port.

9. The outdoor unit system according to claim 1, wherein the first valve port is configured as the first port, the second valve port is configured as the sixth port, the third valve port is configured as the fourth port, the fifth valve port is configured as the third port, the sixth valve port is configured as the fifth port and the seventh valve port is configured as the second port.

10. A multi-split air-conditioner, comprising an outdoor unit system of a multi-split air-conditioner, wherein the outdoor unit system comprises:
a compressor having a gas outlet and a gas inlet;
an outdoor heat exchanger having an inlet and an outlet;
a switching assembly having first to sixth ports, wherein the first port is connected with the gas outlet of the compressor, the second port is connected with the gas inlet of the compressor, the third port is connected with the inlet of the outdoor heat exchanger, the fourth port is connected with the outlet of the outdoor heat exchanger, the fifth port is connected with an inlet pipe and the sixth port is connected with an outlet pipe,
wherein the switching assembly comprises a first four-way valve and a second four-way valve, the first four-way valve has first to fourth valve ports, the second four-way valve has fifth to eighth valve ports, the fourth valve port is connected with the eighth valve port, the first to third valve ports and the fifth to seventh valve ports are configured as the first to sixth ports correspondingly.

11. The multi-split air-conditioner according to claim 10, wherein the first valve port is configured as the first port, the second valve port is configured as the third port, the third valve port is configured as the fifth port, the fifth valve port is configured as the sixth port, the sixth valve port is configured as the fourth port and the seventh valve port is configured as the second port.

12. The multi-split air-conditioner according to claim 11, wherein the first four-way valve and the second four-way valve share a switching assembly capillary which is communicated with the gas outlet of the compressor.

13. The multi-split air-conditioner according to claim 11, wherein the switching assembly is configured as a single reversing valve.

14. The multi-split air-conditioner according to claim 13, wherein the switching assembly comprises: a hollow shell and a sliding block slidably disposed within the shell, the shell defines first to sixth connection ports therein, the first connection port, the third connection port and the fifth connection port are formed in a side wall of the shell in a sliding direction of the sliding block and spaced from one another, the third connection port is located between the first connection port and the fifth connection port, the second connection port, the fourth connection port and the sixth connection port are formed in a side wall of the shell in the sliding direction of the sliding block and spaced from one another, the fourth connection port is located between the second connection port and the sixth connection port, a first channel and a second channel spaced from each other are formed in the sliding block, the first channel is communicated with the third connection port, the second channel is communicated with the fourth connection port, the first connection port is configured as the first port, the second connection port is configured as the second port, the third connection port is configured as the third port, the fourth connection port is configured as the fourth port, the fifth connection port is configured as the fifth port and the sixth connection port is configured as the sixth port.

15. The multi-split air-conditioner according to claim 13, wherein the switching assembly comprises: a hollow shell and a sliding block slidably disposed within the shell, the shell defines first to sixth connection ports therein, the first connection port, the third connection port and the fifth connection port are formed in a side wall of the shell in a sliding direction of the sliding block and spaced from one another, the third connection port is located between the first connection port and the fifth connection port, the second connection port, the fourth connection port and the sixth connection port are formed in a side wall of the shell in the sliding direction of the sliding block and spaced from one another, the fourth connection port is located between the second connection port and the sixth connection port, a first channel and a second channel spaced from each other are formed in the sliding block, the first channel is communicated with the third connection port, the second channel is communicated with the fourth connection port, the first connection port is configured as the fourth port, the second connection port is configured as the third port, the third connection port is configured as the second port, the fourth connection port is configured as the first port, the fifth connection port is configured as the fifth port and the sixth connection port is configured as the sixth port.

16. The multi-split air-conditioner according to claim 13, wherein the switching assembly comprises: a hollow shell and a sliding block slidably disposed within the shell, the shell defines first to sixth connection ports therein, the first connection port, the third connection port and the fifth connection port are formed in a side wall of the shell in a sliding direction of the sliding block and spaced from one another, the third connection port is located between the first connection port and the fifth connection port, the second connection port, the fourth connection port and the sixth connection port are formed in a side wall of the shell in the sliding direction of the sliding block and spaced from one another, the fourth connection port is located between the second connection port and the sixth connection port, a first channel and a second channel spaced from each other are formed in the sliding block, the first channel is communicated with the third connection port, the second channel is communicated with the fourth connection port, the first connection port is configured as the first port, the second connection port is configured as the second port, the third connection port is configured as the sixth port, the fourth connection port is configured as the fifth port, the fifth connection port is configured as the fourth port and the sixth connection port is configured as the third port.

17. The multi-split air-conditioner according to claim 10, wherein the first valve port is configured as the fourth port, the second valve port is configured as the second port, the third valve port is configured as the fifth port, the fifth valve port is configured as the sixth port, the sixth valve port is configured as the first port and the seventh valve port is configured as the third port.

18. The multi-split air-conditioner according to claim 10, wherein the first valve port is configured as the first port, the second valve port is configured as the sixth port, the third valve port is configured as the fourth port, the fifth valve port is configured as the third port, the sixth valve port is configured as the fifth port and the seventh valve port is configured as the second port.

* * * * *